Nov. 24, 1970  C. D. BARRON ET AL  3,541,863
DENSIMETER AND ACTUATOR
Filed Oct. 4, 1968
3 Sheets-Sheet 1
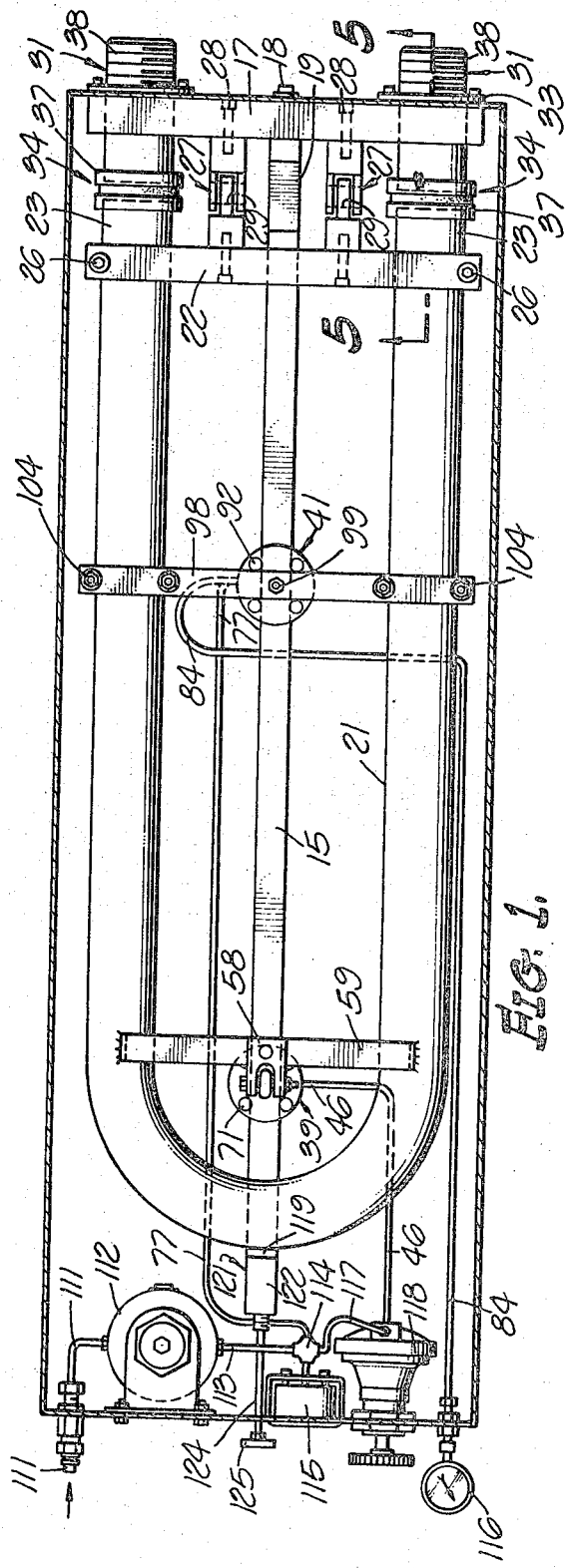
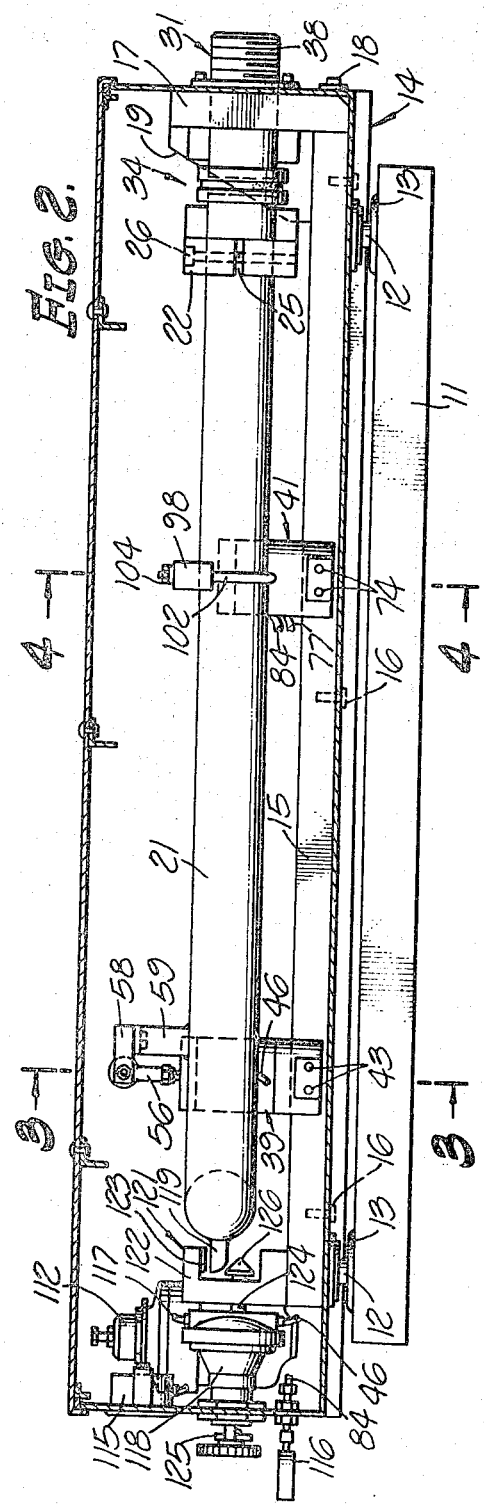
INVENTORS.
CHARLES D. BARRON
LOREN B. SHELDON
BY
John O. Evans, Jr.
ATTORNEY Nov. 24, 1970  C. D. BARRON ET AL  3,541,863
DENSIMETER AND ACTUATOR
Filed Oct. 4, 1968  3 Sheets-Sheet 3

INVENTORS.
CHARLES D. BARRON
LOREN B. SHELDON
BY
John O. Evans, Jr.
ATTORNEY

United States Patent Office 3,541,863
Patented Nov. 24, 1970

3,541,863
DENSIMETER AND ACTUATOR
Charles D. Barron, Huntington Beach, and Loren B. Sheldon, Long Beach, Calif., assignors to Byron Jackson Inc., Long Beach, Calif., a corporation of Delaware
Filed Oct. 4, 1968, Ser. No. 765,219
Int. Cl. G01n 9/06; G01g 23/14
U.S. Cl. 73—434
11 Claims

ABSTRACT OF THE DISCLOSURE

A U-tube densimeter for measuring the densities of liquids and/or controlling such densities including a pneumatically operated actuator for zeroing the U-tube and balancing its tare weight, the actuator including a hydraulic dampening device.

BACKGROUND OF THE INVENTION

Field of the invention

This invention relates to densimeters. More particularly, the invention relates to a densimeter having an actuator that is pneumatically operated and that includes a hydraulic dampener.

Description of the prior art

Heretofore, U-tube densimeters have employed counterweights to counterbalance the tare weight of the U-tube. The employment of such counterweights increases the overall weight of the instrument and makes it more complex and oftentimes large. The known densimeters have employed separate, usually hydraulic, dampening devices to dampen oscillations of the pivoted U-tube, which oscillations are derived from operation of the automatic force balance device employed for weighing the contents of the U-tube. Such separate dampeners, which are usually dashpots, are subject to contamination and leakage.

SUMMARY OF THE INVENTION

An object of the invention is to eliminate the need for counterweights in U-tube densimeters and the like.

Another object of the invention is to eliminate the need for a separate hydraulic dampening device for controlling oscillations of the U-tube.

Another object of the invention is to provide an actuator for use in controlling oscillations of the weigh beam of a weighing device such as a densimeter.

Another object of the invention is to provide a densimeter in which the zero set calibrations can be made from a remote station.

In brief, the invention is embodied in a densimeter including a base; a U-tube; means for mounting the U-tube on the base for pivoting about a horizontal axis; means for causing a liquid, the density of which is to be measured, to flow through the U-tube; an actuator device acting between the base and the U-tube for pneumatically counterbalancing the tare weight of the U-tube in its neutral position; means including a force balancing device acting between the base and the U-tube for automatically restoring the U-tube to its neutral position when it is deflected in response to variations in the weight of liquid flowing through it; and means providing a signal that is a known function of the force exerted on said U-tube by the force balancing device. The actuator device may include hydraulic dampening means.

The invention also resides in the foregoing actuator device.

BRIEF DESCRIPTION OF THE DRAWINGS

FIG. 1 is a plan view of the preferred embodiment of a densimeter in accordance with the invention, the outer case being shown in section;

FIG. 2 is an elevational view of the densimeter of FIG. 1, the front of the case being shown in section;

In the several figures of the drawings and in the following detailed description, like reference numerals designate corresponding parts.

DESCRIPTION OF THE PREFERRED EMBODIMENTS

Figure 3:
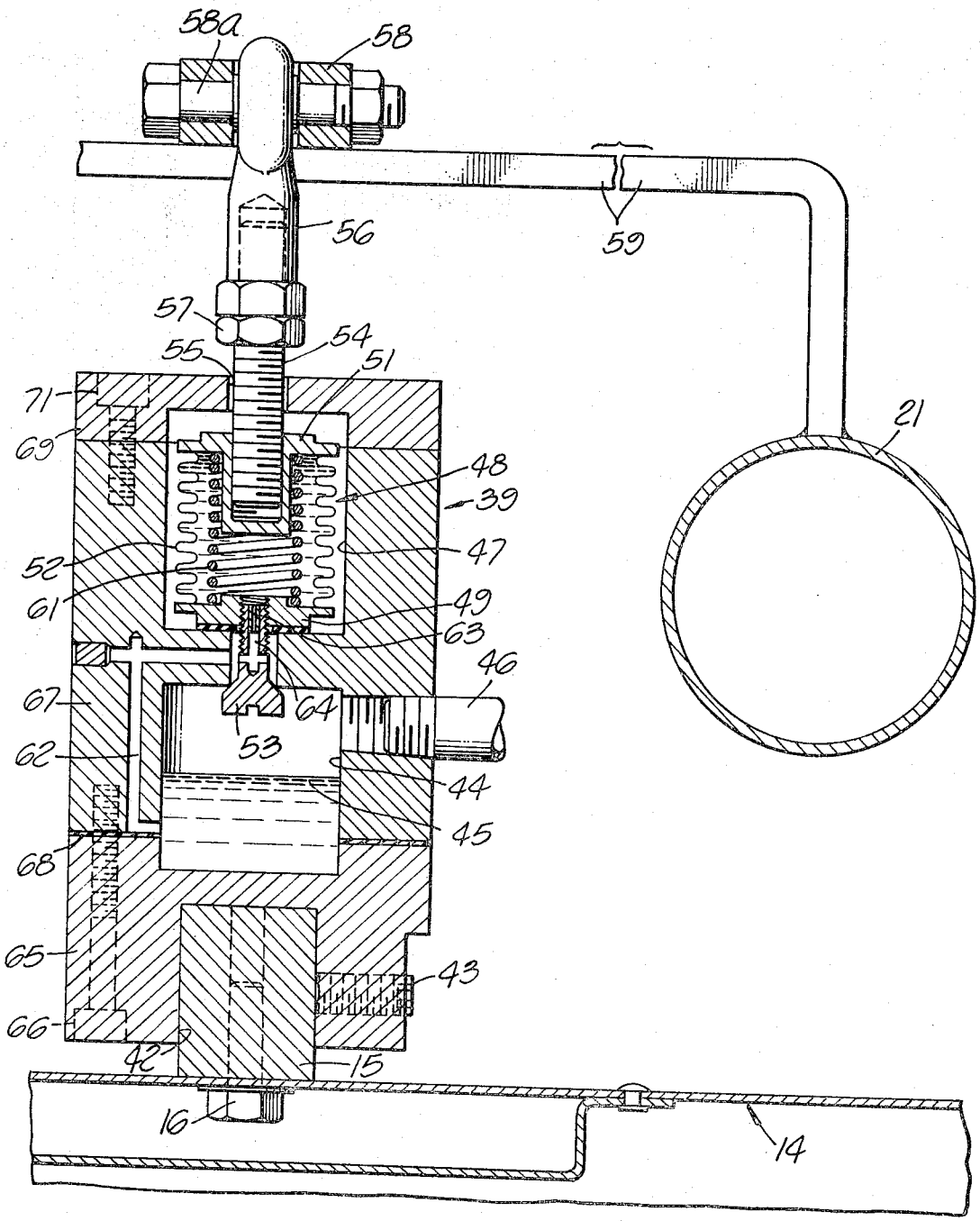
FIG. 3 is an enlarged sectional view taken on the line 3—3 of FIG. 2 and looking in the direction of the arrows.

Referring to the drawings, particularly to FIGS. 1 and 2, the densimeter shown therein has a shock mount 11. Posts 12 mounted in rubber grommets 13 support the case 14 which the densimeter is housed. A center rail 15 that forms a base for the densimeter extends longitudinally within the case 14 and is secured to the case by screws 16. A transverse, vertical plate 17 is secured to the center rail 15 by a screw 18 extending through the case 14, through the plate 17, and threaded into the center rail 15. A gusset plate 19 is fitted into the angle between the center rail and the plate 17 and is fastened to these members to strengthen the assembly.

Figure 5:
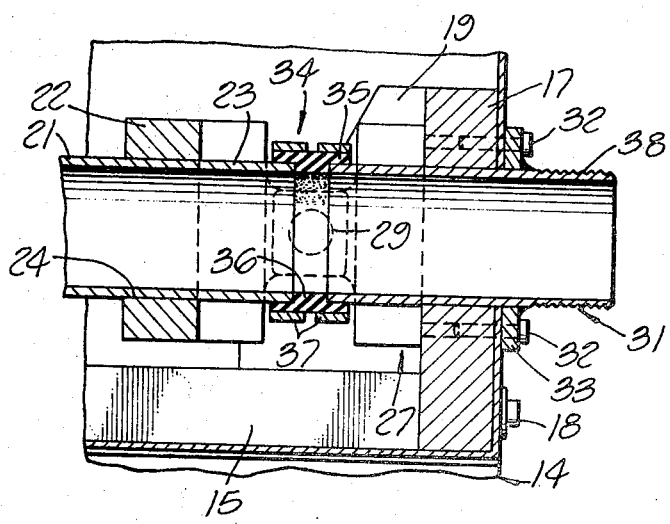
FIG. 5 is an enlarged sectional view taken on the line 5—5 of FIG. 1 and looking in the direction of the arrows.

The densimeter has a U-tube 21 pivotally supported on the plate 17 for swinging movements about a horizontal axis. The pivotal mounting means of the U-tube is best seen in FIGS. 1, 2 and 5. Referring to these figures, it is seen that a U-tube mounting bracket 22 supports the U-tube adjacent to its open ends 23. The ends of the U-tube pass through holes 24 in the mounting bracket. The bracket has slots 25 in its outer ends that open into the holes 24 so that the screws 26, when tightened, will contract the bracket about the ends of the U-tube to hold it securely in the bracket.

A pair of hinges, each designated by the reference numeral 27, is fastened between the U-tube mounting bracket 22 and the plate 17 by means of screws 28. The hinges have pivots 29 that are aligned with each other along a pivot axis that intersects the extended axes of the open ends of the U-tube at right angles.

A liquid, the density of which is to be sensed or measured, is circulated through the U-tube. For this purpose, flanged nipples 31, having the same external and internal diameters as the U-tube, are mounted in the plate 17 in alignment with the legs of the U-tube. These nipples pass through suitable apertures in the plate 17 and the case 14 and are secured in place by screws 32 extending through the flanges 33 of the nipples and threaded into the plate 17.

The nipples 31 are connected to the ends of the U-tube by couplings 34. As best seen in FIG. 5, each coupling 34 has a flexible sleeve 35, such as a neoprene sleeve, fitted about the ends of the nipple and the U-tube leg. The sleeve has an integral, inwardly projecting central flange portion 36 that fills the space between the end of the nipple and the end of the U-tube leg. The flange portion 36 has an inside diameter the same as the inside diameters of the nipple and the U-tube leg and provides a smooth and continuous bore merging smoothly into the bores of the nipple and the U-tube. The flange portion eliminates the recess which, in the absence of the flange, would exist between the ends of the nipple and the U-tube, which recess would trap solid material suspended in the liquid flowing through the ports. Such entrapment of solid material is disadvantageous, particularly in the testing of liquid suspensions of foods where cleanliness is of paramount importance. Metal bands 37 surround the sleeve 35 at each end to prevent radial expansion of the sleeve. It will be seen from FIG. 5 that the axis of the pivots 29 extend transversely through the centers of the couplings 34, and that this axis is located midway between the ends of the nipples 31 and the open ends 23 of the U-tube 21.

The flanged nipples 31 are threaded on their outer ends 38 for connection to liquid inlet and outlet lines.

It will thus be see that the U-tube 21 is mounted for pivotal movement about the horizontal axis of the pivots 29. As seen in FIG. 2, the U-tube 21 is urged by gravity to pivot in a counterclockwise direction. A device denominated herein as an actuator, designated by the general reference numeral 39, opposes this tendency. This actuator will be described in detail hereinafter.

A second device, denominated herein as a load cell 41, is a force-balance mechanism that restores the U-tube to its neutral position when it is deflected by changes in the weight of the liquid flowing through it. This load cell also provides a signal that is related to the variations in the weight of the U-tube and its contents which change with changes in the density of the liquid flowing through the U-tube. The load cell 41 will be described in detail hereinafter.

The actuator 39 is shown in enlarged section in FIG. 3. The actuator has a slot 42 in its underside fitting the center rail 15 to which it is fastened by two set screws 43. The actuator includes a liquid reservoir 44 containing a liquid 45, which may be oil. The reservoir 44 is enclosed and a gas line 46 communicates with the interior of the reservoir above the surface of the liquid 45.

In the actuator 39 and above the liquid reservoir 44 is a recess 47 containing a longitudinally expansible and contractible chamber device designated by the general reference numeral 48.

The chamber device 48 has a lower head 49 and an upper head 51 connected together by a metallic bellows element 52 that is hermetically sealed to the upper and lower heads. The lower head 49 is fastened or fixed to the actuator body by a retainer screw 53. The upper head 51 has a rod 54 threaded into it, the rod 54 extending vertically out from the actuator 39 through an opening 55. The rod 54 is threaded into an eye 56 to which it is locked by a nut 57. The eye 56 is pivoted by a pin 58a to an arm 58 projecting horizontally from an actuator bracket 59 welded to the legs of the U-tube 21 adjacent to the bent or closed end of the U-tube.

Within the chamber device 48 and compressed between the lower and upper heads is a helical spring 61 that tends to expand the chamber device.

The interior of the chamber device 48 is in fluid communication with the liquid reservoir 44 through a liquid conduit 62. The liquid conduit 62 includes a restricted orifice member 63 in that portion 64 of the liquid conduit 62 that is formed or provided in the retainer screw 53. The liquid 45 fills the reservoir to about the level indicated in FIG. 3; it also fills the liquid conduit 62 and the entire space within the chamber device 48. Thus, the pressure of the gas in the liquid reservoir 44 above the surface of the liquid 45 is transmitted by the liquid to the interior of the chamber device 48.

As specifically shown in FIG. 3, the actuator 39 has a bottom portion 65 fastened by screws 66 to an intermediate portion 67 to which the lower portion is sealed by a gasket 68. A cap 69 is fastened to the intermediate portion 67 by screws 71.

Figure 4:
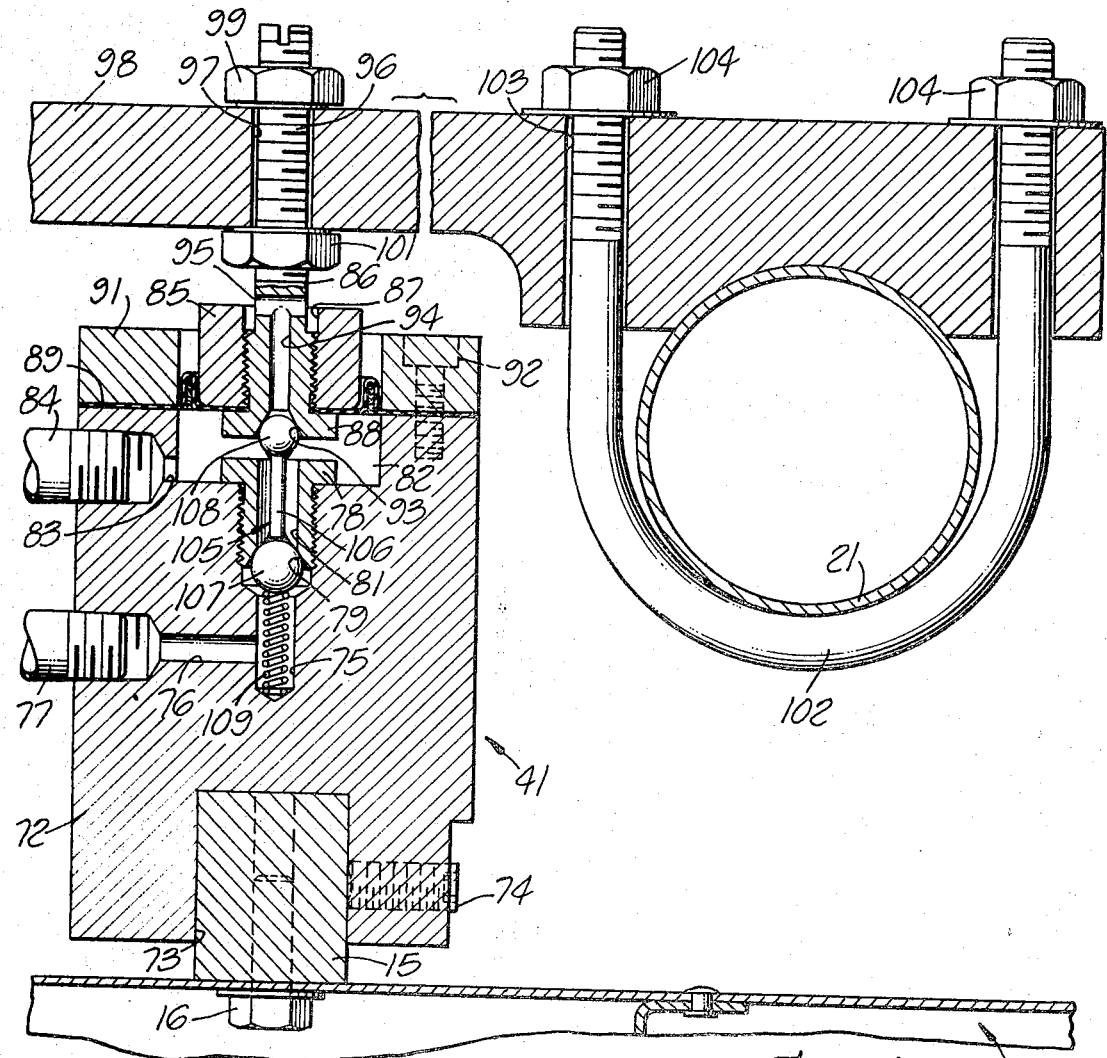
FIG. 4 is an enlarged sectional view taken on the line 4—4 of FIG. 2 and looking in the direction of the arrows.

The load cell will now be described with reference to FIGS. 1, 2 and 4. As shown herein, this load cell is of the type shown and described in United States Pat. No. 3,187,584 issued June 8, 1965, R. E. Hudson, "Densimeter." As shown herein, the load cell has an upstanding cylindrical body 72 provided with a slot 73 in its bottom which receives the center rail 15. A pair of set screws 74 locks the body to the rail in a selected longitudinal position.

Within the body 72 is a lower chamber 75. An air inlet passage 76 admits air from the pipe 77 into the lower chamber 75. Threaded into the top of the lower chamber is a plug 78 having a valve seat 79 at its lower end and a vertical passageway 81 that communicates the lower chamber with an upper chamber 82. A port 83 communicates the upper chamber with a signal line 84.

At the top of the upper chamber 82 is a piston 85. A rod 86 extends through an opening 87 in the piston and is threaded therein. The rod has a flange 88 at the bottom that clamps and seals the inner edge of a flexible annular diaphragm 89 to the bottom of the piston. The outer portion of the diaphragm is clamped and sealed to the body 72 by a ring 91 fastened to the body by screws 92.

A valve seat 93 is provided at the bottom of the rod 86. The upper chamber 82 can communicate with the atmosphere through the vertical channel 94 in the rod that leads into the transverse passageway 95 opening to the atmosphere.

The upper end of the rod 86 is threaded at 96 and extends through an opening 97 in the load cell yoke 98. Jam nuts 99 and 101 threaded on the rod 86 fasten the rod to the yoke in a selective position of adjustment.

The yoke 98 overlies the legs of the U-tube 21 and is secured to the legs by U-bolts 102. As best seen in FIG. 4, each U-bolt 102 passes under a leg of the U-tube 21. The ends of the U-bolt extend through suitable openings 103 in the yoke. Nuts 104 are threaded on the ends of the U-bolt to fasten it to the yoke. With this arrangement the yoke may be secured to the U-tube at a desired longitudinal position.

Within the load cell is a valve member designated by the general reference numeral 105. This valve member is sometimes described as being peanut shaped or dumbbell shaped. It has a central shank 106 of smaller diameter than the passageway 81 through which it extends. A spherical valve portion 107 at the bottom of the shank 106 is adapted to seat upon the lower valve seat 79. At the top of the shank is an upper spherical valve portion 108 that is adapted to seat upon the upper valve seat 93. The valve member 105 is urged upwardly by a helical compression spring 109 compressed between the bottom of the valve portion 107 and the bottom of the lower chamber 75.

Dry air under pressure is supplied to the densimeter from a source (not shown) through a supply line 111. The air under pressure flows through a first pressure regulator 112 wherein the pressure of the air is reduced. The air of reduced pressure flows from the first pressure regulator through a line 113 to a cross 114. A first air pressure gauge 115 connected to the cross, indicates the pressure of the air in the cross. Pipe 77 is connected to the cross 114 and conducts air from the cross to the lower chamber 75 of the load cell 41. The signal line 84 leading from the upper chamber 82 of the load cell is connected to a second air pressure gauge 116.

A line 117 connects the cross 114 to a second pressure regulator 118 wherein the pressure of the air is further reduced. Air of further reduced pressure from the regulator 118 is conducted by gas line 46 to the reservoir 44 of the actuator 39.

If desired, the second pressure regulator 118 and the second air pressure gauge 116 may be located at a station remote from the densimeter, rather than being mounted on the case 14, as shown. When remotely located, the air lines 46, 84 and 117 will, of course, be lengthened accordingly. If desired, a separate air supply may be provided for the regulator 118.

The U-tube 21 has a tang 119 that projects between the horizontal arms of a C-shaped bracket 121 mounted on the center rail 15. Fixed to the underside of the top arm 122 of the bracket 121 is a resilient pad 123 of rubber or the like, adapted to be engaged by the top of the tang 119 to limit upward movement of the tang and the U-tube. A stem 124 is threaded through the bracket 121, the inner end of the stem carrying a conical head 126. A knob 125, external to the case 14, is fixed to the stem 124 and is employed to turn the stem to advance the head 126 into engagement with the bottom of the tang 119 to force the latter into engagement with the pad 123, thus to lock the U-tube against swinging movements. When the head 126 is in retracted position, as seen in FIG. 2, the U-tube is free to pivot to a limited but sufficient extent.

The operation of the densimeter specifically shown and described herein will be largely apparent from the foregoing description. However, the following brief description of setting up and operating the densimeter will now be given.

The densimeter is placed in a substantially level position. The air supply line 111 is connected to a suitable source of air under pressure (not shown). By way of example, air may be supplied to the densimeter at a pressure of from about 25 or 30 p.s.i. to about 300 p.s.i. The first pressure regulator 112 is adjusted to supply compressed air to the cross 114 at a substantially constant pressure of about 25 p.s.i. as indicated by the first air pressure gauge 115. The second pressure regulator 118 is then adjusted to supply air at a substantially constant pressure of about 7.5 p.s.i. to the actuator 39 through the gas line 46. The tang 119 of the U-tube is unlocked by manipulation of knob 125 in a direction to withdraw the conical head 126 from beneath the tang. The U-tube 21 is now free to pivot on its horizontal axis through the hinges 27.

The chamber device 48 of the actuator 39 will have been completely filled with a light to medium weight oil, and this oil fills not only the chamber device but also the liquid conduit 62, 63, 64 and also fills approximately the bottom half of the liquid reservoir 44, as seen in FIG. 3. If necessary the eye 56 may be adjusted on the rod 54 so that the tang 119 can swing between the pad 123 and the conical head 126 without having the upper head 51 of the chamber device 48 strike the underside of the cap 69.

The second pressure regulator is carefully adjusted so that the U-tube 21 assumes a substantially horizontal position with the tang 119 positioned about midway in the space between the pad 123 and the conical head 126. This zero adjustment is made with the U-tube empty and with the load cell 41 temporarily disengaged from the yoke 98 by loosening the jam nuts 99 and 101.

Next, the densimeter is calibrated by adjustment of the load cell 41 first with water being circulated through the U-tube and again with a liquid of greater and known density being circulated through the U-tube. With these two standard liquids, a zero adjustment of the gauge 116 and a span or sensitivity adjustment are made. It will be seen that when the set screws 74 and the nuts 104 are loosened, the load cell and its yoke may be moved longitudinally along the center rail 15 and U-tube 21 to a desired position and thereafter fixed in such position by tightening such screws 74 and the U-bolt nuts 104. Shifting the load cell away from the pivot axis of the U-tube decreases sensitivity; shifting of the load cell toward the pivot axis of the U-tube increases sensitivity.

The second air pressure gauge 116 senses the pressure signal of the load cell 41. This gauge is zeroed in a well known manner by adjusting the vertical position of the rod 86 that connects the piston 85 to the yoke 98, such adjustment being made with air being supplied to the load cell through the pipe 77.

After the sensitivity and the zero output signal of the load cell have been set, the densimeter is in condition to measure the density of an unknown liquid flowing through the U-tube and also to measure variations in the density of the unknown liquid.

As is known from the aforementioned Hudson patent, the load cell 41 operates as a force balance device that restores the U-tube to its neutral or substantially horizontal position as changes in weight of the liquid flowing through the U-tube tend to displace it from its neutral position. The pressure of gas in the upper chamber 82 of the load cell acts on the piston 85 to counterbalance the downward force on the rod 86 due to the weight of the liquid in the U-tube. The pressure of the gas in this upper chamber is directly proportional to this downward force.

If the density of the liquid flowing through the U-tube should increase, the piston 85 will be moved downwardly. This movement pushes the valve member 105 downwardly against the force of the spring 109 and opens the passageway 81. Air from the lower chamber 75, which is at higher pressure than the air from the upper chamber 82, flows into the upper chamber to increase the pressure therein and to restore the piston and U-tube to the neutral position. In the neutral position the spherical valve portion 107 closes the lower valve. The gas pressure in the upper chamber 82 is now increased in proportion to the increase in density of the liquid flowing through the U-tube, and this increase is reflected in the reading of the second air pressure gauge 116.

If the density of the liquid in the U-tube should decrease, the piston 85 would be urged upwardly by the gas pressure in the upper chamber 82. When this occurs, the upper valve 108, 93 is opened allowing some of the air in the upper chamber to escape through the channel 94, 95 to the atmosphere, thereby reducing pressure in the chamber 82. When this occurs, the piston is restored to its neutral position and the resultant lower pressure in the chamber 82 is reflected in the reading of the air pressure gauge 116. This reading is proportional to the changed density of the liquid being tested.

From the foregoing description it will be seen that various changes can be made in the exemplary or preferred embodiment of the densimeter shown and described herein without departing from the invention. For example, it is not essential that a separate orifice tube, such as the restricted orifice member 63, be inserted in the fluid conduit connecting the interior of the bellows with the reservoir in order to obtain adequate hydraulic dampening. Instead, the entire connecting passageway, or any selected portion thereof, may have an internal diameter of such size that proper hydraulic dampening is achieved. Moreover, it will be seen that the actuator will function to balance the tare weight of the U-tube even when it is not charged with hydraulic fluid; however, in this case hydraulic dampening will not occur, but a separate dashpot or dampener may be provided, if desired.

The employment of a compression spring, such as the spring 61 in the interior of the chamber device 48, provides some mechanical dampening of the system and also provides some of the support for the U-tube. Employment of the spring enables the use of lower gas pressures in the chamber means and increases the sensitivity of the actuator. It will thus be seen that the present invention makes it possible to dispense with counterweights and separate dampening devices.

It is not essential that the specific form of load cell shown be employed. Other types of load cells or automatic force balancing devices may be used instead; one such type as disclosed in United States Pat. 3,039,310, June 19, 1962, Copland et al., "Density Meter." Electromagnetic load cells may also be employed.

The densimeter of the present invention can be adapted for the control of the density of liquid mixture as well as for the measurement of the denstiy of liquids, as is well understood.

As pointed out hereinbefore, the second air pressure gauge 116 or read-out gauge and the second pressure regulator 118 may be located at a point remote from the densimeter. It is frequently advantageous to so locate these components so that the operator can be comfortably housed in a control room apart from the place where the densimeter per se is installed.

We claim:

1. A densimeter comprising: a base; a U-tube; means for mounting said U-tube on said base for pivoting about a horizontal axis; means for causing a liquid, the density of which is to be measured, to flow through said U-tube; an actuator device acting between said base and said U-tube for pneumatically counterbalancing the tare weight of said U-tube in its neutral position; means including a force balancing device acting between said base and said U-tube for automatically restoring said U-tube to its neutral position when it is deflected in response to variations in the weight of liquid flowing through it; and means providing a signal that is a known function of the force exerted on said U-tube by said force balancing device; wherein said actuator device comprises:
   (a) chamber means longitudinally expansible and contractible with variations in chamber volume;
   (b) one end of said chamber means being fixed to said base and the other end being fixed to said U-tube;
   (c) a fluid reservoir;
   (d) fluid conduit means communicating the chamber of said chamber means with said reservoir for flow of fluid therebetween;
   (e) means for introducing gas into said reservoir; and
   (e) means for regulating the pressure of said gas.

2. A densimeter comprising: a base; a U-tube; means for mounting said U-tube on said base for pivoting about a horizontal axis; means for causing a liquid, the density of which is to be measured, to flow through said U-tube; an actuator device acting between said base and said U-tube for pneumatically counterbalancing the tare weight of said U-tube in its neutral position; means including a force balancing device acting between said base and said U-tube for automatically restoring said U-tube to its neutral position when it is deflected in response to variations in the weight of liquid flowing through it; and means providing a signal that is a known function of the force exerted on said U-tube by said force balancing device; wherein said actuator device comprises:
   (a) chamber means longitudinally expansible and contractible with corresponding variations in chamber volume;
   (b) one end of said chamber means being fixed to said base and the other end being fixed to said U-tube;
   (c) a liquid reservoir;
   (d) liquid conduit means communicating the chamber of said chamber means with said reservoir for flow of liquid therebetween;
   (e) means for subjecting liquid in said reservoir to the pressure of gas; and
   (f) means for regulating the pressure of said gas.

3. A densimeter as defined in claim 2 wherein said liquid conduit means provides a restricted path for the flow of liquid therethrough to hydraulically dampen movements of said chamber means.

4. A densimeter as defined in claim 2 including orifice means in said liquid conduit means for restricting the flow of liquid therethrough to dampen movements of said chamber means.

5. A densimeter as defined in claim 2 including a spring within said chamber means exerting an expanding force thereon.

6. A densimeter as defined in claim 2 wherein said chamber means comprises a bellows.

7. An actuator device for counterbalancing the tare weight of a weigh beam pivotally mounted on a base and the like which comprises:
   (a) chamber means longitudinally expansible and contractible with corresponding variations in chamber volume;
   (b) means for fixing one end of the chamber means to the base and the other end to the weigh beam;
   (c) a liquid reservoir;
   (d) liquid conduit means communicating the chamber of said chamber means with said reservoir for flow of liquid therebetween;
   (e) means for subjecting liquid in said reservoir to the pressure of gas, and
   (f) said conduit means providing a restricted path for the flow of liquid therethrough to hydraulically dampen movements of said chamber means.

8. An actuator device as defined in claim 7 including orifice means in said liquid conduit means for restricting the flow of liquid therethrough to dampen movements of said chamber means.

9. An actuator device as defined in claim 7 including a spring within said chamber means exerting an expanding force thereon.

10. An actuator device as defined in claim 7 wherein said chamber means comprises a bellows.

11. An actuator device as defined in claim 7 wherein said liquid reservoir is enclosed, and said means for subjecting liquid in said reservoir to the pressure of gas comprises a gas inlet port above the location at which said liquid conduit means communicates with said reservoir.

References Cited
UNITED STATES PATENTS

| | | | |
|---|---|---|---|
| 2,432,039 | 12/1947 | Plank | 73—434 |
| 2,313,509 | 3/1943 | Bohannan | 177—175 |
| 3,187,584 | 6/1965 | Hudson | 73—434 |

RICHARD C. QUEISSER, Primary Examiner

ELLIS J. KOCH, Assistant Examiner

U.S. Cl. X.R.

177—164